Figure 1:
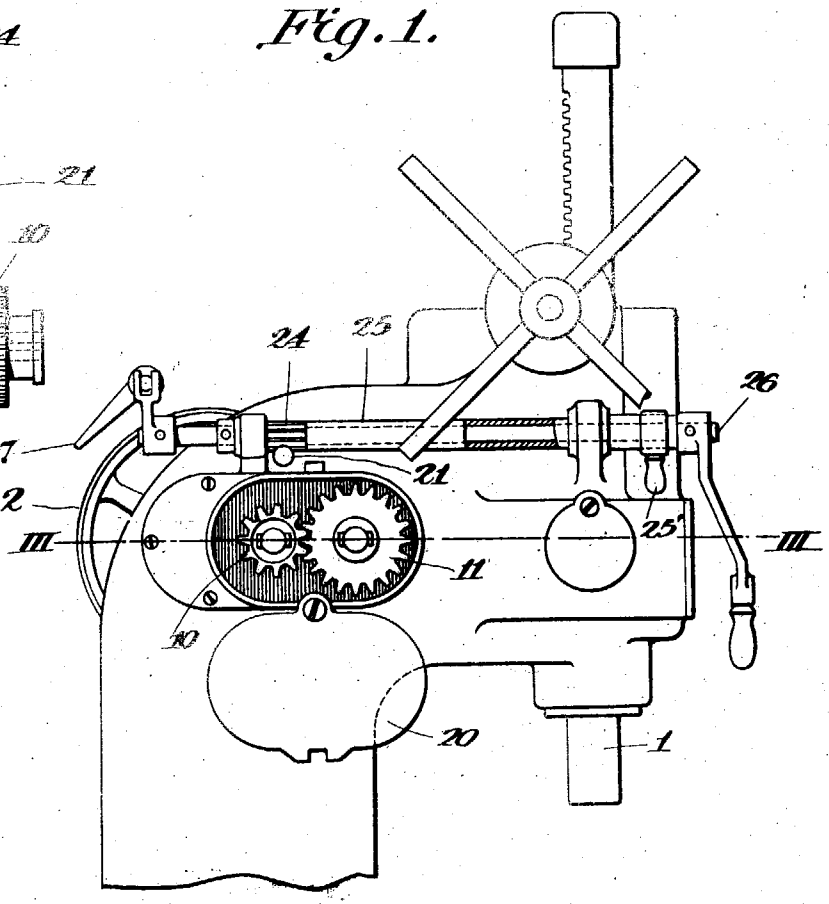

F. F. CLARKE.

DRILL PRESS.

APPLICATION FILED FEB. 27, 1917.

Reissued July 17, 1917.

14,327.

2 SHEETS—SHEET 1.

Inventor:
Frederick F. Clarke
by
Mauro, Cameron, Lewis & Massie
Attys

F. F. CLARKE.

DRILL PRESS.

APPLICATION FILED FEB. 27, 1917.

Reissued July 17, 1917.

14,327.

2 SHEETS—SHEET 2.

Inventor:
Frederick F. Clarke
by
Mauro, Cameron, Levin & Massie
Attys.

UNITED STATES PATENT OFFICE.

FREDERICK F. CLARKE, OF FRANKLIN, PENNSYLVANIA, ASSIGNOR TO COLBURN MACHINE TOOL COMPANY, OF FRANKLIN, PENNSYLVANIA, A CORPORATION OF PENNSYLVANIA.

DRILL-PRESS.

14,327. Specification of Reissued Letters Patent. Reissued July 17, 1917.

Original No. 1,167,887, dated January 11, 1916, Serial No. 34,046, filed June 14, 1915. Application for reissue filed February 27, 1917. Serial No. 151,176.

*To all whom it may concern:*

Be it known that I, FREDERICK F. CLARKE, a citizen of the United States of America, and a resident of Franklin, Pennsylvania, have invented a new and useful Improvement in Drill-Presses, which invention is fully set forth in the following specification.

The object, construction and utility of this invention are herein set forth with sufficient clearness to enable those skilled in the art of machine-tool construction to make and use the same, and the scope of my invention is clearly defined in the claims.

As heretofore constructed, drill presses of the spindle type here shown have been provided with gearing for driving the drill spindle, whereby a large number of changes of speed of said spindle are obtainable, and in fact, it has been the aim of the manufacturers of such drill presses to provide in their machines, all the possible changes of speed which might be required in all the various aggregate lines of work for which the machines might be used. The reason for this provision lies in the fact that, in the commercial manufacture of such machine tools, it can seldom be known in advance, for what line of work they will be used. While these many changes of speed appear to be requisite in order to enable the manufacturers of the drill presses to meet various requirements, it is often the case that the user of the machine will require only a few of these possible speeds. This means that, wherever such drills are used in the manufacture of duplicate or interchangeable parts,—upon a single detail of which the drill may be continuously employed or operated for a long period of time—the greater number of the possible speed changes of the spindle are never used, and that the gearing whereby said speed changes are obtainable is not only unnecessary, but, in addition thereto, the presence of same undesirably complicates the machine, adds to its power consumption, and adds to the cost of its upkeep and maintenance, to which may be properly added an unnecessarily high first cost.

It is, therefore, the object of my invention, to provide a drill press of the spindle type, especially adapted for manufacturing purposes, and to supply the same with gearing for revolubly driving the drill-spindle, whereby the particular drill-speed requirement of each individual user may be met without the employment of superfluous gearing and unnecessary speeds, and wherein the objectionable qualities above mentioned, incidental to the use of the usual type of gearing are obviated.

Figure 2:
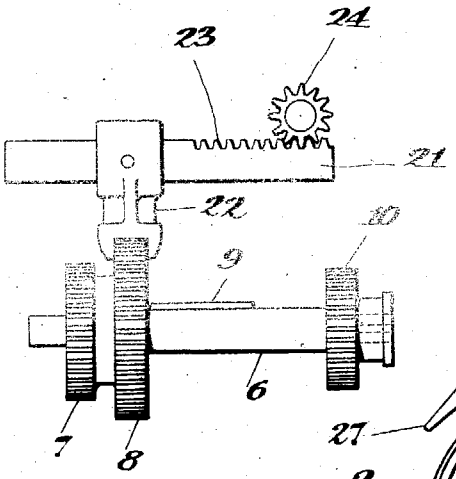
Figure 3:
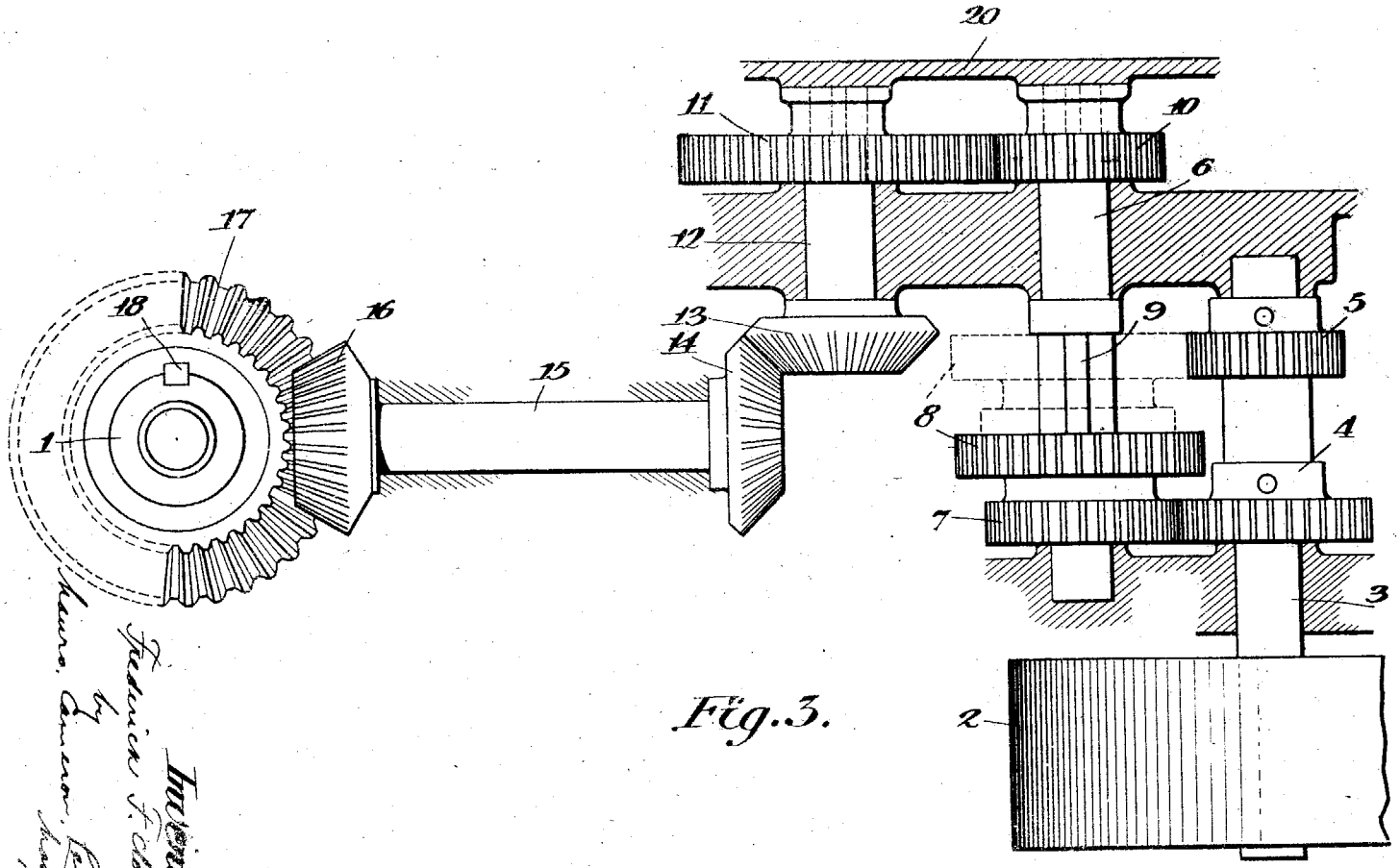

One form of construction whereby I attain said objects is clearly illustrated in the drawings, the various figures of which are as follows:

Figure 1 is a side elevation of the upper portion of a drill press, which embodies my invention. Fig. 2 is a detail. Fig. 3 is a plan view of a train of gearing whereby my inventive idea is clearly embodied, and represents approximately a section on line III—III of Fig. 1.

The construction shown is substantially as follows: The spindle of the drill press is indicated by the reference numeral 1 in Figs. 1 and 3. Revoluble motion is transmitted to said spindle from a power-receiving pulley 2, through a train of gearing and suitable shafting, in which are included the following elements: a revoluble shaft 3, upon which are rigidly mounted the spur gears 4 and 5; a revoluble shaft 6, arranged in suitable proximity to and parallel with said shaft 3; upon said shaft 6 are mounted the longitudinally-shiftable gears 7 and 8 which are feathered to said shaft 6 by means of the gib or feather 9, so that said shaft 6 may be driven by either of said gears 7 or 8. Said gears may be shifted upon said shaft 6 so that gear 7 will mesh with gear 4, as shown in Fig. 3, or so that gear 8 will mesh with gear 5, as shown by the dotted lines in said Fig. 3, thus providing two changes of transmissive speed from shaft 3 to shaft 6. Upon the outer end of shaft 6 is mounted a readily-removable gear 10, which meshes with and transmits motion through another readily-removable gear 11 to the shaft 12 which carries said gear 11. Said gears 10 and 11 are adapted to be transposable or interchangeable, and, being of different diameters, are adapted to cause by such transposition, changes of speed in the transmission of motion from shaft 6 to shaft 12. The transmission from shaft 12 to spindle 1, is through the gears 13 and 14 to shaft 15, and gears 16 and 17;

said gear 17 being feathered to and operably mounted upon said spindle 1 by means of the feather 18.

For the purpose of causing said gears 10 and 11 to be readily accessible, for removal and transposition, or for the substitution of other gears therefor, I inclose the same in a specially-provided case formed upon the side of the bed, housing or column of the drill press and provide said case with a swinging or otherwise readily-removable or opening cover 20, which, when closed, serves to retain said gears 10 and 11 upon their respective shafts by contact with the outer ends of the hubs thereof, as shown in Fig. 3.

For the purpose of shifting the gears 7 and 8, as above stated, upon their shaft 6, I provide the following means: Mounted in the column of the drill press is a horizontally positioned, longitudinally-movable rod 21, which carries a gear engaging member 22, which engages the gear 8. Said rod 21 is provided with a rack 23 which is operably engaged by a pinion 24. Said pinion 24 is carried by a hollow shaft 25 that is provided with a lever or handle 25′ adapted for turning said shaft 25 and pinion 24 to operate rod 21 and shift the gears 7 and 8. A shaft 26 passes through shaft 25 and is adapted to actuate the belt-shipper 27, which shifts the driving belt from the driving pulley 2 to a loose pulley that is mounted in proximity to said pulley 2. Inasmuch, however, as said elements 25, 26 and 27 do not form a portion of the invention here set forth, a more detailed description of same will not be given.

From the foregoing description it will be readily understood that, with the gearing here provided, four changes of speed are made possible, and that two gears of any desired ratio may be quickly and easily substituted for the gears 10 and 11, and that said gears 10 and 11, whatever their ratio may be, are readily transposable; that by such transposition, two changes of speed are provided.

When the drill-speed requirements for any service are known, they may be readily, cheaply and quickly supplied by providing gears 10 and 11 of a suitable ratio. At a small expense for extra pairs of gears 10 and 11 of various ratios, other requirements may be met, through a large range of speed.

I claim the following:—

1. The combination with the spindle of a drill press, of a train of gearing operable to revolve said spindle, two parallel shafts having fixed centers, two intermeshing gears in said train mounted upon said shafts, said gears differing as to ratio or diameter and being transposably mounted for the purpose of causing, by the transposition thereof, a variation in the revoluble speed of said spindle.

2. The combination with the spindle of a drill press, of a train of gearing operable to revolve said spindle and comprising among its elements two parallel shafts having fixed centers, a gear mounted upon each of said shafts, said gears being in mesh with each other and being also interchangeable for the purpose of causing a change of speed between said shafts by such interchange, additional gears in said train shiftably mounted upon their respective shafts whereby additional variations of speed are obtainable.

3. A drill press comprising a column, a vertical drill spindle rotatably mounted in said column, and a train of gearing operatively connected to said spindle to rotate the same, said gearing comprising among its elements two parallel shafts having fixed centers rotatably mounted in and extending transversely of said column and a pair of intermeshing gears mounted on said shafts and readily removable therefrom for substitution by other gears of different ratio.

4. A drill press comprising a column, a drill spindle rotatably mounted in said column, and a train of gearing operatively connected to said spindle to rotate the same, said gearing comprising among its elements two parallel shafts having fixed centers rotatably mounted in and extending transversely of said column, said shafts projecting exteriorly of said column, and a pair of intermeshing gears mounted on the projecting ends of said shafts and readily removable therefrom for substitution by other gears of different ratio.

5. A drill press comprising a housing, a drill spindle rotatably mounted in said housing, and a train of gearing operatively connected to said spindle to rotate the same, said gearing comprising among its elements two parallel shafts having fixed centers rotatably mounted in said housing and extending transversely of said drill spindle and a pair of intermeshing gears mounted on said shafts and readily removable therefrom for substitution by other gears of different ratio.

6. A drill press comprising a housing, a drill spindle rotatably mounted in said housing, and a train of gearing operatively connected to said spindle to rotate the same, said gearing comprising among its elements two parallel shafts having fixed centers rotatably mounted in said housing and projecting exteriorly thereof and a pair of intermeshing gears mounted on the projecting ends of said shafts and readily removable therefrom for substitution by other gears of different ratio.

7. A drill press comprising a housing, a drill spindle rotatably mounted in said housing, and a train of gearing operatively connected to said spindle to rotate the same, said train of gearing comprising substantially coplanar shafts and gears including a pair of parallel shafts rotatably mounted in said housing and having fixed centers and a pair of intermeshing gears mounted on said shafts and readily removable therefrom for substitution by other gears of different ratio.

8. A drill press comprising a housing, a drill spindle rotatably mounted in said housing, and a train of gearing operatively connected to said spindle to rotate the same, said gearing comprising among its elements a pair of parallel shafts having fixed centers rotatably mounted in said housing and extending so as to be readily accessible from the exterior of said housing and a pair of intermeshing gears mounted on said shafts and readily removable therefrom for substitution by other gears of different ratio.

9. A drill press comprising a housing provided with a rigid overhanging portion, a vertical drill spindle rotatably mounted in said overhanging portion, and a train of gearing operatively connected to said spindle to rotate the same, said gearing comprising among its elements a pair of parallel shafts having fixed centers extending transversely of said drill spindle and a pair of intermeshing gears mounted on said shafts and readily removable therefrom for substitution by other gears of different ratio.

10. A drill press comprising a housing, a drill spindle rotatably mounted in said housing, and a train of gearing operatively connected to said spindle to rotate the same, said gearing comprising among its elements two parallel shafts having fixed centers rotatably mounted in said housing and two intermeshing gears mounted on said shafts and readily removable therefrom for substitution by other gears of different ratio.

11. A drill press comprising a housing, a drill spindle rotatably mounted in said housing, and a train of gearing operatively connected to said spindle to rotate the same, said gearing comprising among its elements two parallel shafts having fixed centers rotatably mounted in said housing and two intermeshing gears mounted on said shafts and positioned to be readily accessible from the exterior of said housing, said gears being readily removable from said shafts for substitution by other gears of different ratio.

12. A drill press comprising a column, a vertical drill spindle rotatably mounted in said column, and a train of gearing operatively connected to said spindle to rotate the same, said train of gearing lying substantially in a horizontal plane and comprising among its elements two parallel shafts having fixed centers and two intermeshing gears mounted on said shafts and readily removable therefrom for substitution by other gears of different ratio.

13. A drill press comprising a housing, a drill spindle rotatably mounted in said housing, and a train of gearing operatively connected to said spindle to rotate the same, said gearing comprising among its elements two parallel shafts having fixed centers rotatably mounted in said housing, said shafts being designed to support any one of a plurality of pairs of gears of different ratio, and a pair of such gears in mesh carried by said shafts and readily removable therefrom for substitution by other pairs of said gears.

14. A drill press comprising a housing, a drill spindle rotatably mounted in said housing, a train of gearing operatively connected to said spindle to rotate the same, said gearing comprising a pair of shafts having fixed centers rotatively mounted in said housing and a pair of gears mounted on said shafts for ready removal therefrom, said gears being positioned to be easily accessible for substitution by other gears of different ratio.

In testimony whereof I have signed this specification.

FREDERICK F. CLARKE.